(12) United States Patent
Davies

(10) Patent No.: US 6,555,983 B1
(45) Date of Patent: Apr. 29, 2003

(54) POSITIONING APPARATUS AND METHOD

(75) Inventor: Philip Andrew Davies, Cambridge (GB)

(73) Assignee: Melles Griot Limited, London (GB)

( * ) Notice: Subject to any disclaimer, the term of this patent is extended or adjusted under 35 U.S.C. 154(b) by 0 days.

(21) Appl. No.: 09/470,249

(22) Filed: Dec. 22, 1999

(30) Foreign Application Priority Data

Dec. 23, 1998 (GB) .............................................. 9828633

(51) Int. Cl.$^7$ .............................................. G05B 19/10
(52) U.S. Cl. ...................... 318/567; 318/569; 318/570
(58) Field of Search .............................. 318/567, 568.1, 318/568.11, 568.13, 568.15, 568.17, 568.19, 569, 570, 573, 574, 575, 577; 364/167.2, 167.7, 167.1

(56) References Cited

U.S. PATENT DOCUMENTS

| | | | |
|---|---|---|---|
| 4,617,623 A | * 10/1986 | Inoue et al. | ................. 318/567 |
| 4,798,442 A | 1/1989 | Feilhauer et al. | |
| 5,623,337 A | 4/1997 | Iori et al. | |

FOREIGN PATENT DOCUMENTS

| | | | |
|---|---|---|---|
| GB | 2111245 A | 6/1983 | |
| WO | WO 96/07118 | 3/1996 | |

* cited by examiner

Primary Examiner—Khanh Dang
(74) Attorney, Agent, or Firm—Renner, Otto, Boisselle & Sklar, LLP

(57) ABSTRACT

There is provided an apparatus for, and a method of, driving a plurality of uniaxial positioning elements of positioning stages to perform an automated search to find a signal in a multi-dimensional search space having a dimensionality equal to the number of alignment axes. The automated signal location is achieved by scanning over a search pattern defined by a succession of n−1 dimensional closed hyper-surfaces in an n-dimensional search-space, where n is the number of positioning axes involved in the alignment process. In an embodiment of the invention hyper-cubes are used as the hyper-surfaces and the search path follows a hyper-spiral track over hyper-surfaces of incrementally increasing size. One application is to align input and output optical fibers with a solid-state waveguide structure mounted on a plinth under the control of a positioner controller which outputs motion control signals for the positioning elements over control paths so as to scan over paths on a succession of nested hyper-surfaces until a signal is received through a signal line.

12 Claims, 5 Drawing Sheets

|        | I   | II  | III | IV  | V   |             |
|--------|-----|-----|-----|-----|-----|-------------|
| Spiral | 18  | 135 | 27  | 7   | 5   | Average 38s |
| Raster | 661 | 818 | 799 | 820 | 638 | Average 747s |

POSITIONING APPARATUS AND METHOD

BACKGROUND OF THE INVENTION

The invention relates generally to positioning systems, more especially, but not exclusively, to a method of and apparatus for finding a signal in a multi-dimensional search space.

Positioning systems are often used to achieve relative alignment between two or more components in such a way that there is maximum coupling efficiency of a signal passing between the components concerned. An example is the coupling of signals into or out of optical fibers. Other examples occur in microscopy, including scanning probe microscopy and electron microscopy where non-optical signals are involved.

Generally, the alignment procedure can be sub-divided into two stages as shown in FIG. 1 of the accompanying drawings. The first step, indicated as S1 in FIG. 1, consists of a coarse alignment to find a signal. The second step, indicated as S2 in FIG. 1, consists of a fine alignment to increase the level of the signal found in step S1 to a maximum, or at least to an acceptably large, level.

Automated procedures for the second step of optimizing the signal once it has been found are commercially available. However, the first step of finding the signal prior to optimization is generally performed by hand with a user moving the positioners into the general vicinity of what can be seen to be the general alignment area for the device concerned while looking at a signal indicator. In fact, the initial coupling to find the signal is in many cases the most time consuming part of the procedure, especially if the second step is automated.

SUMMARY OF THE INVENTION

Particular and preferred aspects of the invention are set out in the accompanying independent and dependent claims. Features of the dependent claims may be combined with those of the independent claims as appropriate and in combinations other than those explicitly set out in the claims.

According to the present invention there is thus provided an apparatus for and a method of performing an automated search applicable to finding a signal in a multi-dimensional search space of any number of dimensions. Once found, the signal can then be optimized using standard automated signal optimization procedures.

The automation of the signal location step is achieved by scanning over a search pattern defined by a succession of n−1 dimensional hyper-surfaces in an n-dimensional search-space, where n is the number of positioning axes involved in the alignment process.

The search space is a hyper-space, where n may assume any positive integer value such that n>=4. By the same token, the search surfaces of dimensionality n−1 will be hyper-surfaces, i.e. surfaces of dimensionality of three or more. The word surface is used here in a general sense. If there is a search space of n-dimensions, the surface will be topologically equivalent to a sphere, cube, or whatever other shape is selected, of dimensionality n−1.

The procedure based on scanning over a succession of hyper-surfaces is readily applicable to a search space of any dimensionality and becomes increasingly advantageous as the number of dimensions in the search space increases, both in terms of speed of finding the signal and ease of implementation relative to manual or other intuition-based alignment schemes.

For example, application of the procedure to a six-dimensional search space, as would be represented by alignment involving two xyz-positioners (x1,y1,z1,x2,y2,z2) is straightforward. Moreover, application of the procedure to angular axes of freedom, so-called θ-axes or φ-axes, is no different than application to linear degrees of freedom. In fact, the one-to-one mapping between the degrees of freedom in real space and the dimensions in the hyper-space is totally arbitrary so that the same six-dimensional hyper-space can be used for defining a search pattern for driving an xyzθ-positioner and xy-positioner (x1,y1,z1,θ1,x2,y2) as for the previously-mentioned example of two xyz-positioners (x1,y1,z1,x2,y2,z2). Moreover, for the same reason, any permutation of the one-to-one mapping between the real-space axes and the hyper-space axes will be equivalent. This allows simplification of the construction and operation of appropriate positioner control systems, since, of the n control signal output leads for driving a positioning element in each of the n positioning axes, any one of the output leads can be connected to any one of the positioning elements without affecting performance.

The use of hyper-cubes as the hyper-surfaces is numerically convenient. However, hyper-spheres, or hyper-surfaces of innumerable different topologies may be used instead. Examples of possible hyper-surface, topologies are cubic or cuboid, and spherical or ellipsoid. Especially if some or all of the positioning axes are linear, it is numerically convenient, and also convenient for the control signals, if the hyper-surface is of a shape having at least some cuboid side portions, for example the above-mentioned cubic or cuboid shape, or some other shape.

In an embodiment of the invention, the hyper-surface is topologically equivalent to a hyper-sphere and is expanded incrementally until the signal is located, so that the search procedure scans through a series of hyper-surfaces, each hyper-surface being topologically equivalent to a hyper-sphere and having a radius incrementally larger than the previous hyper-sphere in the series. At any increment step during the search, the search space is thus divided between an inner, searched sub-space and an outer, unsearched sub-space with the hyper-sphere expanding in the manner of a bubble in a quasi-continuous stepwise manner.

For many applications, the hyper-surfaces will be fully enclosed, reflecting a gaussian signal location probability in each dimension of the search space. However, in some applications, there may be a gaussian distribution in some, but not all, of the dimensions of the search space. For example, in a four-dimensional search space, the signal location distribution may be gaussian in only two dimensions in which case the hyper-surfaces can be chosen to be enclosed only in respect of those two dimensions. Such an anisotropic distribution could result from a laser slab mode or semiconductor diode laser output.

The invention has several different aspects, as are exemplified by the attached claims.

One field of application of the invention is in optics to find an optical signal. Within that field, one important group of applications relates to alignment procedures involving optical components such as optical fibers, solid-state waveguides, lasers and related system components, for example in the telecommunications field.

BRIEF DESCRIPTION OF THE DRAWINGS

For a better understanding of the invention and to show how the same may be carried into effect reference is now made by way of example to the accompanying drawings in which.

DETAILED DESCRIPTION

An embodiment of the invention is now described and is directed to searching using a hyper-spiral based search pattern in a four-dimensional (4D) search space. The embodiment is described with reference to a practical example of the alignment of a solid-state waveguide structure in relation to two optical fibers.

Figure 2:
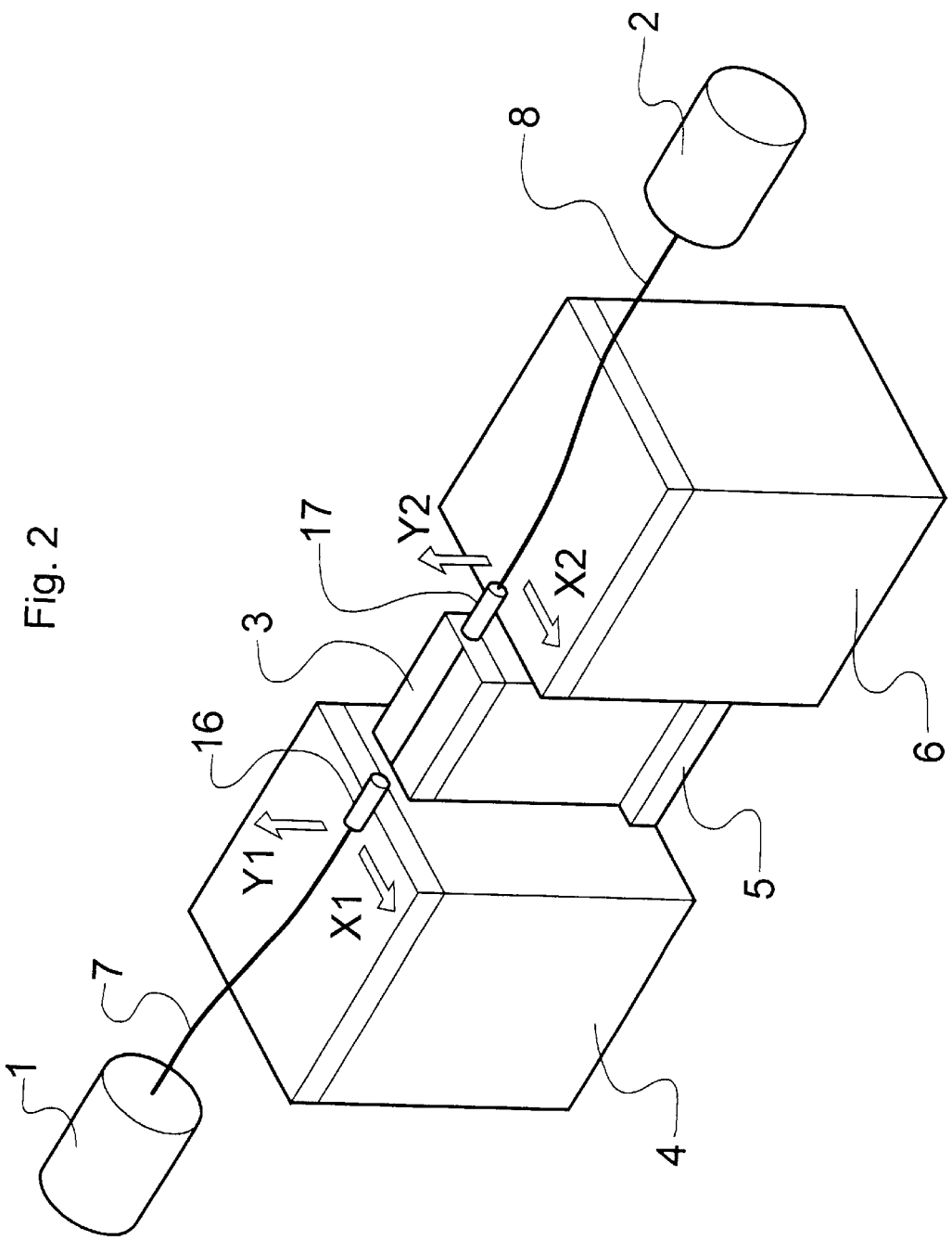
FIG. 2 is a schematic perspective view of elements of a positioning system according to an embodiment of the invention.

FIG. 2 is a perspective view of a solid-state waveguide structure 3 having an input side to be aligned with an output end of an optical fiber 7 leading from an optical source 1, for example a laser. The output end of the optical fiber 7 is encased in a ferrule 16 fixedly attached to a positioning stage 4 which is positionable by respective positioning elements thereof in two orthogonal linear axes X1 and Y 1. The plane defined by the axes X1 and Y1 is generally perpendicular to an optical axis of the fiber 7 defined by the bore of the ferrule 16.

The solid-state waveguide structure 3 is mounted on a fixed plinth 5 with the input of the waveguide of the waveguide structure 3 positioned adjacent to the output end of the optical fiber 7 held in the ferrule 16. The output of the waveguide of the waveguide structure 3 lying on a side of the waveguide structure 3 remote from the side of the waveguide input is, in turn, positioned adjacent to a further ferrule 17 in which an input end of a further optical fiber 8 is encased. The input end of the optical fiber 8 is fixedly attached to a further positioning stage 6 positionable by respective positioning elements thereof in two orthogonal axes X2 and Y2 which both lie generally perpendicular to the optical axis of the fiber 8 defined by the bore of the ferrule 17. The optical fiber 8 leads to an optical detector 2, for example a p-i-n detector.

The 4D search space in this example is thus composed of the two dimensions of the input plane defined by axes X1 and Y1 and the two dimensions of the output plane defined by the axes X2 and Y2.

Figure 3:
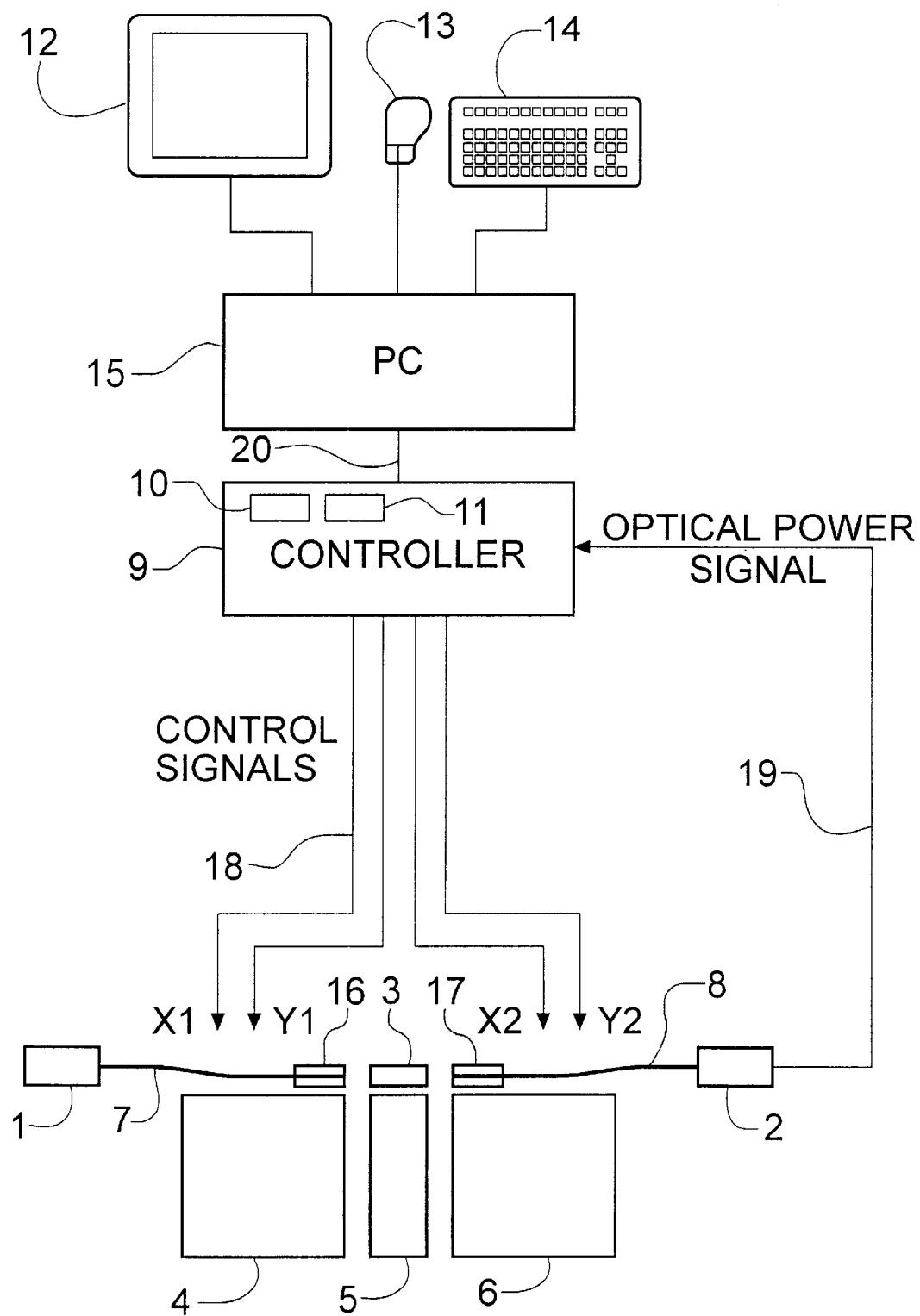
FIG. 3 is a block diagram of the positioning system of the embodiment of FIG. 1.

FIG. 3 is a schematic block diagram showing a complete positioning system, including the position control components, as well as those components shown in FIG. 2. The two positioning stages 4 and 6 are connected to a positioner controller 9 with electrical leads 18 for conveying four control signals, one for each of the four positioning axes X1, Y1, X2 and Y2. The positioning stages may be of the kind configured to receive low level control signals, such as pulse trains, or may be of the kind configured to receive high level control signals, such as a target coordinate or a position increment and direction. The controller 9 is also connected to receive a signal from the optical detector 2 through an electrical lead 19. The controller 9 has control portions 10 and 11 defining separate operational modes of the controller. The two operational modes defined by the control portions 10 and 11 implement the first and second steps, respectively, of the alignment procedure described in the introduction with reference to FIG. 1.

The control portion 11 for outputting control signals to the positioning elements associated with the various positioning axes during signal optimization is a "NanoTrak" control portion, "NanoTrak" being the trade name for a commercially available signal optimization system marketed by the company Melles Griot and documented in that company's publicly available sales literature. Briefly, "NanoTrak" is operable to optimize a signal in a search plane, i.e. in two dimensions by first scanning over a circular path to establish the signal maximum on the circle. The origin of the scan circle is then moved in the direction of the signal maximum point and another circular path is scanned over. This procedure is repeated iteratively until no appreciable signal gradient exists between iterations. This method is applicable to more than two dimensions by performing the scan procedure individually for each of a plurality of search planes. In the present example there are two search planes defined by the axes X1 and Y1, and X2 and Y2 respectively. Signal optimization as performed under the control of control portion 11 is based on the optimization of the signal received by the controller 9 from the optical detector 2 through the electrical lead 19. In this operational mode, the electrical lead 19 thus serves to close a feedback loop under which the control portion 11 drives the individual positioning elements of the positioning stages 4 and 6 for the various axes.

Control portion 10 of the controller 9 is operable to drive the positioning elements of the four axes over a sequence of three-dimensional hyper-surfaces in the 4D search space until a signal is found, as indicated to the controller by its monitoring of the signal received through electrical lead 19. Control portion 10 is configured to output control signals on electrical lead 18 for each of the axes X1, Y1, X2 and Y2 so that when each axis is plotted as one dimension in an n-dimensional space, where n=4 in this example, then the movements of the positioners when plotted in this hyper-space trace out a succession of concentric closed surfaces of increasing size in the search space. In this embodiment, the surfaces are three-dimensional (3D) hyper-cubes in the 4D search space and the search path describes a spiral over each hyper-cube. The search scan thus consists of visiting, or passing through, a sequence of points on a closed surface surrounding an origin, the origin being defined as the start point for the search. When all the points on the surface have been visited, the surface expands by an increment. Points on the new, larger surface are then visited in a similar fashion. Hence, the scan fills out the multi-dimensional search space at an ever increasing distance from the origin until a signal is found.

The word surface is used here in a general sense. If there is a search space of n-dimensions, the surface will be topologically equivalent to a sphere, cube, or whatever other shape, of dimensionality n−1. It may be numerically convenient if the hyper-surfaces are concentric around the start point for the search. Moreover, it is also numerically convenient if the next surface of the succession fully encloses the previous surface.

Generally the hyper-surface will be expanded at each increment. However, if the search space has known finite bounds, that is the signal must lie within certain spatial limits in real space, then it may be preferable to start with a hyper-surface of maximum size bounding the finite search space, and then incrementally contract the hyper-surface until the signal is found. In other embodiments, the hyper-surface increments may vary in direction and size, for example if the full set of hyper-surfaces for a bounded search space are precomputed. The most appropriate increment progression for any given application will depend on knowledge of the signal location distribution which can, for example, be obtained by statistical analysis of the signal location coordinates of previous searches.

The mathematical expression of the search path is now described, taking the example of a hyper-spiral search path over a hyper-cubic surface of arbitrary dimensionality, as this search path is convenient to express mathematically. A hyper-spiral scan $C_n$ in an n-dimensional search space is generated from a series of scans covering closed surfaces of gradually increasing radii, the surface scans being indicated by $\delta C_n(r)$, since they each lie on the boundary of a hyper-cube $C_n(r)$ characterized by a "radius" R, where R is the half side length of the cube. If there is a set P of such radii P=t,2t, 3t, ... R, where t is the increment, then the hyper-spiral will be made up of an ordered set of points:

$$C_n = U_p \delta C_n(r) \quad (1)$$

The remaining problem is to describe the set of surface scan points $\delta C_n(r)$. This is a question of observing that an object such as the surface of a curve $\delta C_3$ can be constructed of a bottom, a middle section and a lid. The bottom and the lid are both square areas, $C_2$ while the middle section is a multiplication, i.e., extrusion, of a line $C_1$ and the surface $\delta C_2$. In other words, $$\delta C_3 = C_2 U(C_1 \times \delta C_2) U\, C_2 \quad (2)$$

Figure 4:
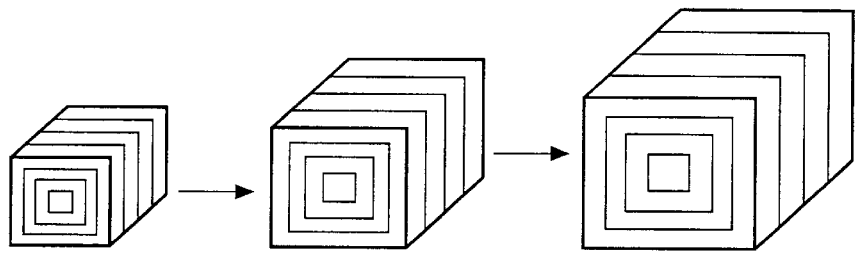
FIG. 4 shows a spiral search path over a succession of three cuboid search surfaces of increasing size.

Recursive application of equations (1) and (2) allows hyper-spirals to be constructed as a series of scan lines as shown schematically in FIG. 4 in terms of a 3D search space. The recursive application of these two equations can thus be used to generate a simple list of numbers in the form of an array where each row in the array represents a points in the search space. A portion of such an array is described further below with reference to FIG. 5. The array can be generated from inputs for the search original (here assumed to be zero) i.e., (0,0 . . . 0), the search radius R which provides a characteristic distance for the search, and a scan increment providing a characteristic size dimension for the stepwise expansion of the search spiral.

The array of coordinates for defining the points visited by the search procedure may conveniently be generated by a software module which can run on a standard personal computer 15 interfaced with the controller 9 through an interface connection 20.

The software module has been implemented using the software package LabVIEW VI. An icon representing a 4D spiral scan is displayed on the computer monitor 12, as shown in FIG. 6, and can be selected by means of a computer mouse 13 or other human interface device.

Figure 5:
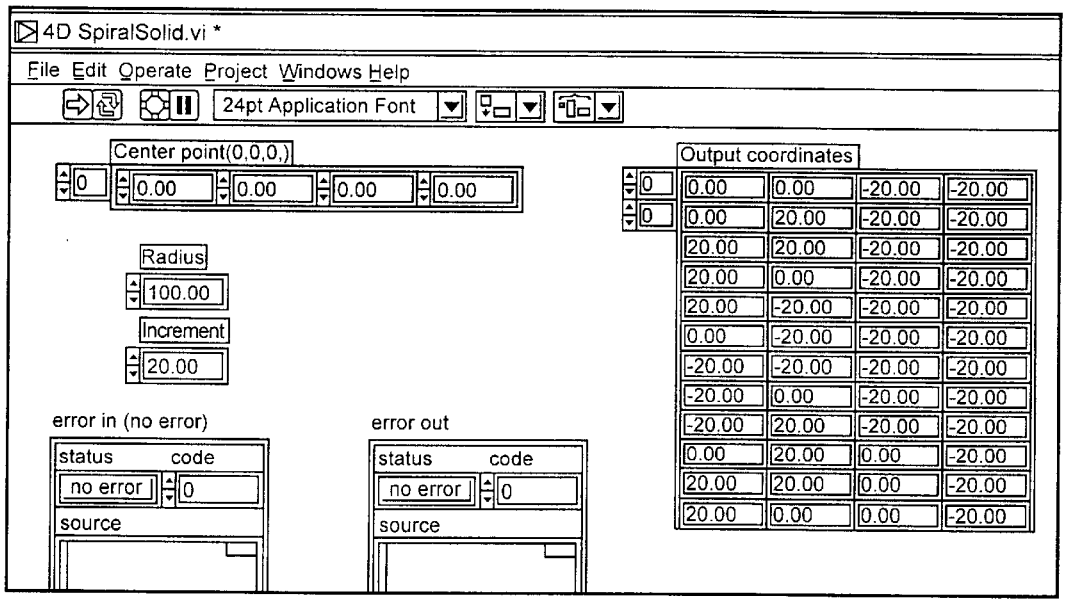
FIG. 5 shows an example of the front panel of the control program based on the software package LabVIEW VI in which the output coordinates of a four dimensional hyper-spiral search pattern are tabulated.
Figure 6:
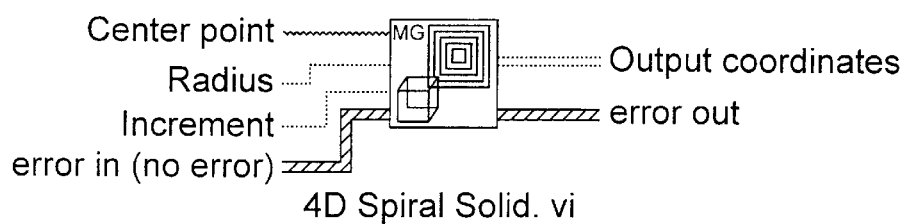
FIG. 6 shows an icon representing a four dimensional hyper-spiral scan in the format required for the software package LabVIEW VI.

FIG. 5 shows a window displayed on the monitor 12 after selection of the icon shown in FIG. 6. The input parameters may then be set manually by a user through a keyboard device 14 connected to the computer 15. The input parameters shown are origin or center point, search radius and increment. FIG. 5 also shows a portion of the array of output coordinates in which the top row of the array represents the first point on the search path after the origin and so forth, there being four columns, one for each positioning axis or dimension in the 4D search space. The array of output coordinates may then be transferred to the controller 9 and stored for future use by the control portion 10, for example in a non-volatile memory of the controller 9 accessible to the control portion 10. Since the set of output coordinates may well be universal for a given application, it can be used over and over again. For example, with reference to FIG. 2, the same search pattern may be used over and over again in a production line environment for aligning and bonding input and output fibers to solid-state waveguide modules. The personal computer and ancillary components 12 to 15 together with interface 20 may thus be detached once the controller has been initialized for the application of interest.

Separate icons may be provided for searches of each common dimensionality, for example for 5, 6, 7 and 8 dimensional search spaces, and a general icon for an n-dimensional search space where n is then a user input parameter. Taking the apparatus shown in FIG. 2 as an example, if microlenses were bonded to the ends of the optical fibers 7 and 8, then the search space would be better defined as six-dimensional to take account of the foci of the microlenses. Positioning stages 4 and 6 would then each need to be positionable in three-dimensions, i.e. would need to be xyz-stages.

Figure 1:
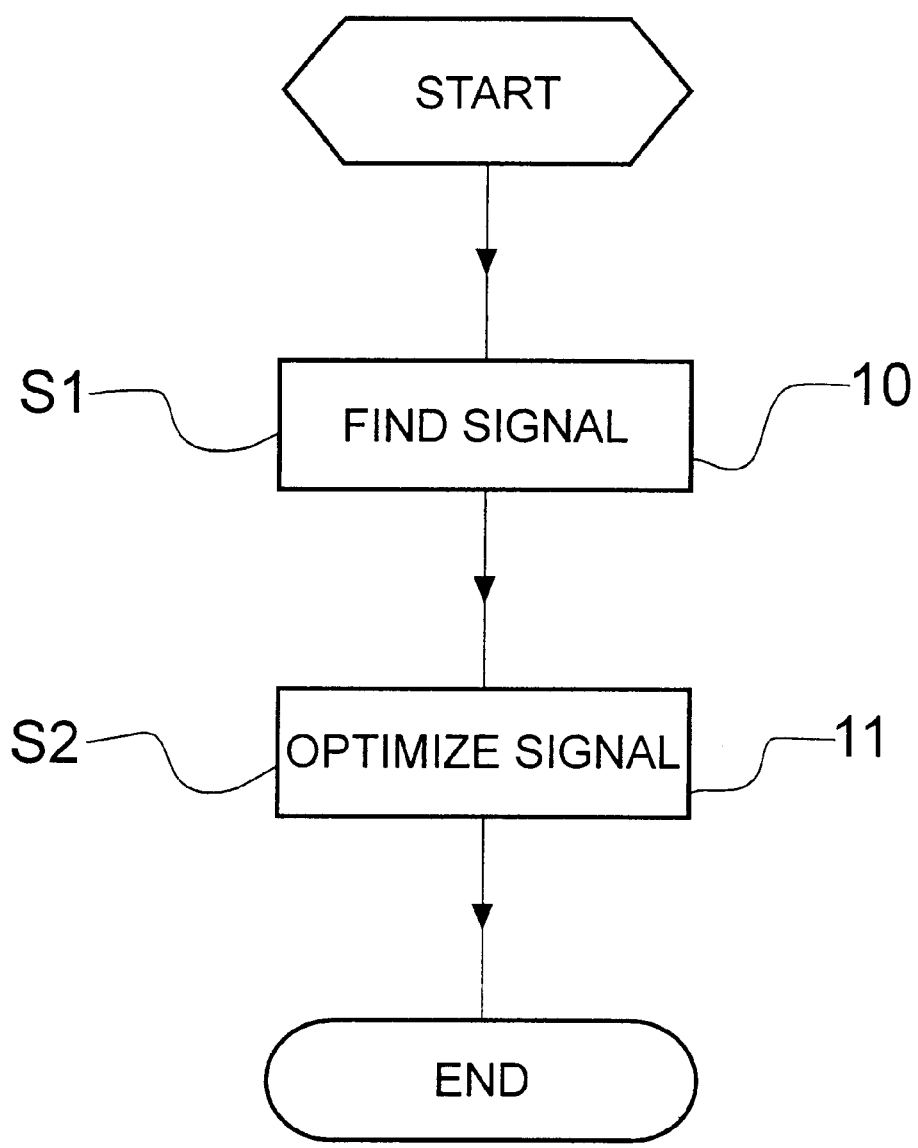
FIG. 1 is a flow diagram of a general alignment procedure.

In operation, referring to FIG. 1, the controller will be started and will output motion control signals under the control of control portion 10 in order to find a signal. The sequence of search points defined in the array of output coordinates will then be followed in sequence until a signal is detected by the controller through the electrical connection 19 at which point the controller will switch to its second operational mode under the control of control portion 11 to optimize the signal in the standard manner described above.

Especially in a production environment, it may be advantageous to configure the controller 9 so that the origin is moved over time on the basis of averaging stored values of the true signal location found in previous searches, bearing in mind that the target coordinates will tend to be clustered around a mean point in the search space for most applications, often with a gaussian or near-gaussian distribution.

Moreover, the controller may be configured to scale the search coordinates by changing the increment size and/or radius on the basis of a statistical analysis of previous searches. The overall search pattern would then stay the same but the search path would be moved.

Figures 7, 8:
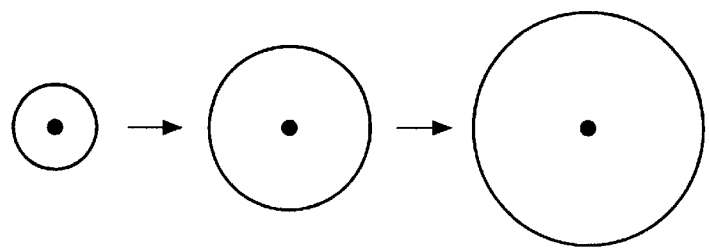
FIG. 7 is a comparison table showing the time taken to find a signal using a four-dimensional hyper-cube search pattern (spiral) and a four-dimensional raster scan (raster) for five separate trials I to V.
FIG. 8 shows a succession of three spherical search surfaces of increasing size.

FIG. 7 shows the results of five comparative trials I to V carried out to test the performance of the hyper-spiral search of the embodiment, driving the positioners over the four axes X1, Y1, X2, Y2 illustrated in FIG. 2, relative to a raster search which scans in a 2D raster over each of the two planes defined by X1 and Y1, and X2 and Y2, respectively. A raster scan is a line-based scanning technique familiar from electron beam scanning of a television set, for example. As can be seen from the tabulated results, in the 4D search space, the hyper-spiral scan was on average approximately twenty times faster in finding the signal than the raster scan. Further tests indicate that the comparative speed of the hyper-spiral search in relation to a raster search increases supra-linearly as the dimensionality of the search space increases.

From the foregoing it will be appreciated that a hyper-spiral search path on a hyper-cube surface is but one example of a search path envisaged. A search based on a succession of hyper-spheres, as shown schematically in FIG.

8 is also feasible and can be expected to be slightly more efficient than the hyper-cube based search, at the cost of being slightly more arduous to implement. The shape of the search surface may be selected having regard to the application concerned. For example if the signal distribution is known to be asymmetrical, for example elongate, than an appropriately shaped search pattern can be selected.

It will be appreciated that although particular embodiments of the invention have been described, many modifications/additions and/or substitutions may be made within the spirit and scope of the present invention as defined in the appended claims.

What is claimed is:

1. A positioner controller for generating motion control signals for driving each of at least four positioning element over respective axes of motion, the controller having a control portion operable to output motion control signals for causing motion over a search pattern coordinated in each of the at least four axes of motion, the control portion being operable to:
   (a) associate each axis of motion with a dimension of an n-dimensional hyper-space, where n is at least four;
   (b) define a starting hyper-surface of dimensionality one less than the number of axes of motion around a search origin;
   (c) obtain a set of coordinates defining a search path over the hyper-surface;
   (d) output motion control signals to cause the positioning elements to follow the search path; and
   (e) expand or contract the hyper-surface by an incremental amount and repeat steps (c) and (d).

2. A positioner controller according to claim 1, wherein the starting and incremented hyper-surfaces fully enclose one another.

3. A positioner controller according to claim 2, wherein the starting and incremented hyper-surfaces are concentric.

4. A positioner controller according to claim 1, wherein the series of hyper-surfaces formed by repetition of steps (c) and (d) is topologically equivalent to a series of concentric hyper-spheres having radii that progress by each said incremental amount.

5. A positioner controller according to claim 1, wherein each hyper-surface is enclosed in respect of at least two of its dimensions.

6. A positioner controller according to claim 1, wherein each hyper-surface is topologically equivalent to a hyper-sphere.

7. A positioner controller according to claim 1, wherein each hyper-surface comprises cuboid side portions.

8. A positioner controller according to claim 1, wherein each hyper-surface is substantially cuboid or cubic.

9. A positioner controller according to claim 1, wherein each hyper-surface substantially ellipsoid or spherical.

10. A positioning system comprising a positioner controller according to any one of the preceding claims and a plurality of n positioning elements, each for positioning in an axis of motion, the positioner controller being connected to the positioning elements by respective control paths for transmission of the control signals to the positioning elements.

11. A positioning system comprising:
    a plurality of at least four positioning elements, each for positioning in an axis of motion;
    a controller for generating motion control signals for the positioning elements and having an input for receiving an external signal; and
    control path connections between the controller and the positioning elements for transmitting the motion control signals to the positioning elements,
    the control portion being operable in an operational mode in which the following sequence of steps is carried out until a signal is received at the controller input:
    (a) associate each axis of motion with a dimension of an n-dimensional hyper-space, where n is at least four;
    (b) define a starting hyper-surface of dimensionality one less than the number of motion axes;
    (c) obtain a set of coordinates to define a search path over the hyper-surface;
    (d) output control signals to the positioners to cause the positioners to follow the search path; and
    (e) expand or contract the hyper-surface by an incremental amount and repeat steps (c) and (d).

12. A positioning system according to claim 11, wherein, in said operational mode, the positioner controller is responsive to receipt of a signal at the controller input automatically to switch to a further operational mode in which the signal is used as a feed-back control parameter to which the motion control signals are responsive, thereby to optimize the signal.

* * * * *